US011869254B2

United States Patent
Troia et al.

(10) Patent No.: US 11,869,254 B2
(45) Date of Patent: *Jan. 9, 2024

(54) METHOD AND APPARATUS TO RECOGNIZE TRANSPORTED PASSENGERS AND GOODS

(71) Applicant: Lodestar Licensing Group, LLC, Evanston, IL (US)

(72) Inventors: Alberto Troia, Munich (DE); Antonino Mondello, Messina (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,274

(22) Filed: Oct. 21, 2022

(65) Prior Publication Data
US 2023/0041670 A1 Feb. 9, 2023

Related U.S. Application Data

(63) Continuation of application No. 16/625,399, filed as application No. PCT/IB2018/001165 on Oct. 12, 2018, now Pat. No. 11,482,017.

(51) Int. Cl.
*G06V 20/00* (2022.01)
*G06V 20/05* (2022.01)
(Continued)

(52) U.S. Cl.
CPC ............ *G06V 20/05* (2022.01); *H04L 9/0643* (2013.01); *H04L 9/0819* (2013.01); *H04W 4/48* (2018.02); *H04L 9/50* (2022.05)

(58) Field of Classification Search
CPC ..... G06V 20/59; H04L 9/0643; H04L 9/0819; H04L 2209/38; H04W 4/48; B60R 25/102; G07C 5/008
(Continued)

(56) References Cited

U.S. PATENT DOCUMENTS 6,185,487 B1   2/2001   Kondo et al.
8,754,751 B1   6/2014   Picolli
(Continued)

FOREIGN PATENT DOCUMENTS

WO   2014031560   2/2014

OTHER PUBLICATIONS

Aigner et al., "Device Identity with DICE and RIoT: Keys and Certificates", Microsoft Corporation, Sep. 1, 2017, pp. 1-15, retrieved from <https:www.microsoft.com/en-us/research/wp-content/uploads/2017/09/KeysAndCertificatesForDiceAndRIoT-v3-2.docx>.
(Continued)

*Primary Examiner* — Neil R McLean
(74) *Attorney, Agent, or Firm* — Brooks, Cameron & Huebsch, PLLC

(57) ABSTRACT

A method and apparatus to recognize transported passengers and goods are disclosed herein. One example includes an apparatus comprising a processor unit on a vehicular entity, a communication component coupled to the processor unit, and a memory portion associated to the processor unit and structured to store information and data received through the communication component about at least one of passengers, luggage and/or goods on the vehicular entity, with the communication component being activated by a presence of the at least one of the passengers, luggage and/or goods on the vehicular entity.

20 Claims, 11 Drawing Sheets

(51) Int. Cl.
*H04W 4/48* (2018.01)
*H04L 9/06* (2006.01)
*H04L 9/08* (2006.01)
*H04L 9/00* (2022.01)

(58) Field of Classification Search
USPC .......................................................... 382/103
See application file for complete search history.

(56) References Cited

U.S. PATENT DOCUMENTS

| | | |
|---|---|---|
| 2014/0090280 A1 | 4/2014 | Cunningham |
| 2015/0166009 A1* | 6/2015 | Outwater ................ B60R 25/25 701/2 |
| 2016/0352709 A1* | 12/2016 | Nunally .............. H04L 63/0435 |
| 2017/0213403 A1* | 7/2017 | Diehl ........................ G07C 9/27 |
| 2018/0040172 A1 | 2/2018 | Funk |
| 2018/0099643 A1 | 4/2018 | Golsch |
| 2018/0351941 A1 | 12/2018 | Chhabra |

OTHER PUBLICATIONS

Mattoon et al., "DICE: Foundational Trust for IoT", 2017 Flash Memory Summit Proceedings, Aug. 8, 2017, Santa Clara, CA, pp. 1-13, retrieved from <https:www.flashmemorysummit.com/English/Collaterals/Proceedings/2017/2170808_FT11_Mattoon.pdf>.

International Search Report and Written Opinion for related PCT Application No. PCT/IB2018/001165, dated Jul. 25, 2019, 17 pages.

Brostrom, U.S. Appl. No. 62/675,991, filed May 2018, with Non-Final Office Action dated Apr. 8, 2022.

\* cited by examiner

METHOD AND APPARATUS TO RECOGNIZE TRANSPORTED PASSENGERS AND GOODS

PRIORITY INFORMATION

This application is a Continuation of U.S. application Ser. No. 16/625,399, filed on Dec. 20, 2019, which is a National Stage Application under 35 U.S.C. § 371 of International Application Number PCT/IB2018/001165, filed on Oct. 12, 2018, the contents of which are incorporated herein by reference.

TECHNICAL FIELD

The present disclosure relates generally to apparatuses and methods related to vehicles, and more particularly, to recognize transported passengers, luggage or goods.

BACKGROUND

Motor vehicles, such as autonomous and/or non-autonomous vehicles, (e.g., automobiles, cars, trucks, buses, etc.) can use sensors and/or cameras to obtain information about their surroundings to operate safely. As used herein, an autonomous vehicle can be a vehicle in which at least a portion of the decision-making and/or control over vehicle operations is controlled by computer hardware and/or software/firmware, as opposed to a human operator. For example, an autonomous vehicle can be a driverless vehicle.

For autonomous vehicle and rental car there is the need to recognize the passengers and/or the transported luggage and/or good. For instance, the identification of passengers and goods may be useful in several occasions and is a specific duty of the police or the traffic authorities. Even for rental cars a fast identification of passengers, luggage or good may be useful in several occasions.

However, up to now the only way to satisfy this need is that of stopping the vehicle and ask for documentation or inspect about the passenger occupancy and the transported goods. This inspection phase is particularly delicate for autonomous vehicles, i.e. vehicles in which at least a portion of the control over vehicle operations is controlled by computer hardware and/or software/firmware.

DETAILED DESCRIPTION

Figure 1:
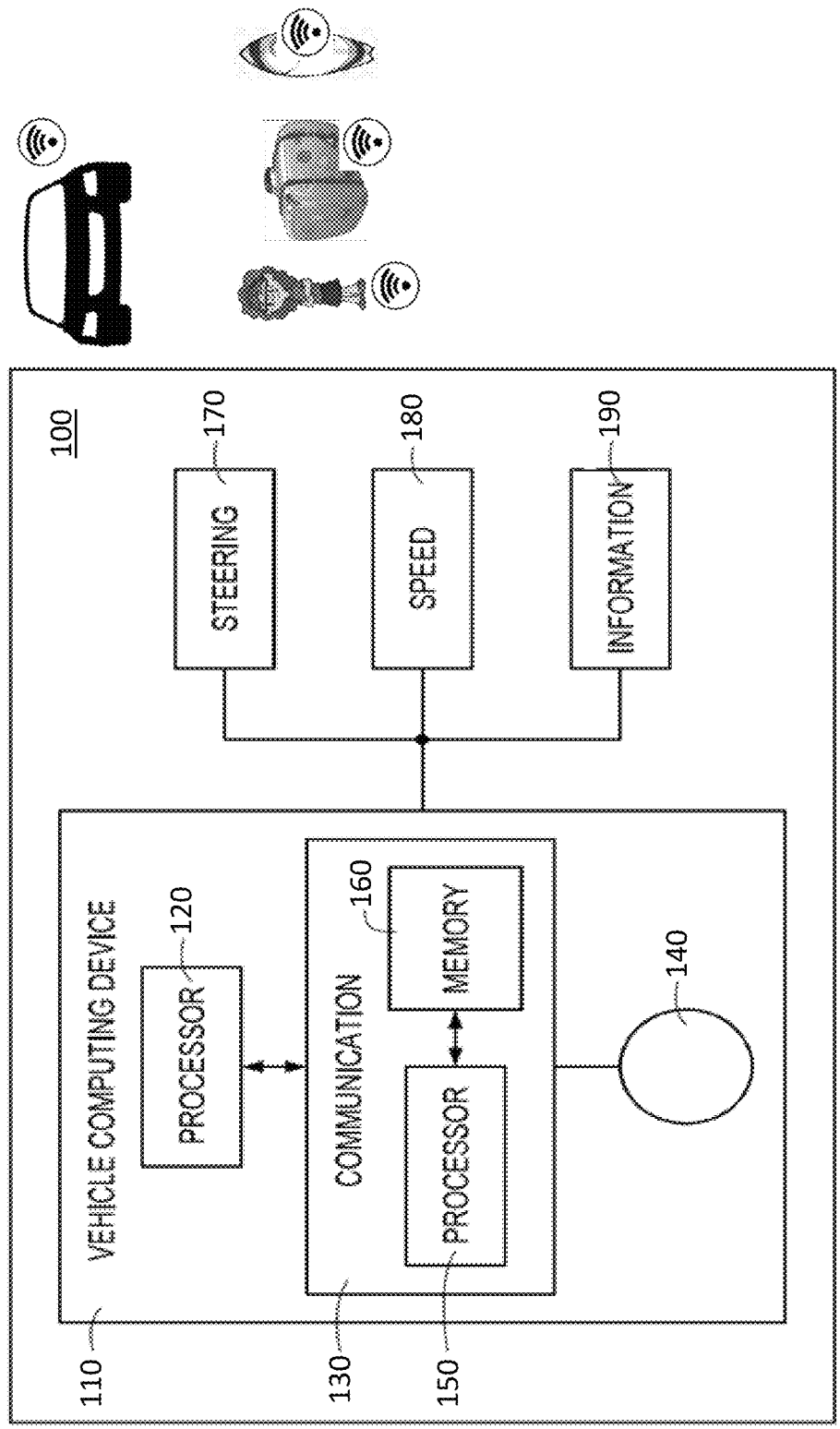
FIG. 1 is a block diagram of an example vehicular entity, in accordance with an embodiment of the present disclosure.

With reference to those figures, apparatuses and methods recognizing a vehicle and the transported passengers and goods will be disclosed herein.

More particularly, as it will be described into details in the following, an example of an apparatus according to the present invention includes an internal communication component. Such an apparatus comprises: a processor unit on a vehicular entity; a communication component coupled to the processor unit, a memory portion associated to said processor unit and structured to store information and data received through said communication component at least about passengers, luggage and goods on the vehicular entity; said communication component being activated by the presence of passengers, luggage and/or goods on the vehicular entity.

The memory portion may be a non-volatile memory device, for instance a semiconductor memory device.

Another embodiment of the present invention relates to an apparatus comprising: a vehicle computing device including a processor; an internal wireless communication component associated to said vehicle computing device and coupled to the processor; a memory portion associated to said processor unit and structured to store information and data relating at least to passengers, luggage or goods on the vehicle; said information and data being automatically transmitted to said vehicle computing device and to said memory through said internal wireless communication component.

It should be noted that the information and data received though the communication component is real time stored and/or updated in said memory portion any time that a passenger, a luggage or a good are boarded on the vehicular entity.

Another example of apparatus according to the present disclosure comprises a processor unit and a vehicular communication component coupled to the processor unit, wherein the vehicular communication component is configured to, in response to determining that the vehicular communication component is within a particular proximity to an external communication component, generate a vehicular private key and a vehicular public key, provide the vehicular public key to the external communication component, wherein the external communication component is associated with a portable detection device, receive an external public key from the external communication component, encrypt data using the external public key, provide the encrypted data to the external communication component, the vehicular data relating to at least one of: vehicle ID, driver ID/permissions, passengers IDs/permissions, and/or transported goods, receive validation/authorization data from the external communication component in response to providing the encrypted data to the external communication component, and decrypt the received data using the vehicular private key.

The present disclosure also relates to a system comprising the above internal and external apparatuses communicating with each other.

The present disclosure further relates to a method comprising: detecting by a wireless communication component associated to a vehicle computing device real time information about passengers, luggage or goods boarding on that vehicle; up-dating a memory portion coupled to vehicle computing device with said detected information; enabling on request the transmittal of said information stored in said memory portion toward an external entity.

Advantageously, said enabling phase is performed exchanging encrypted data.

Another embodiment disclosed in the following specification relates to a method comprising the steps of: detecting in real time the presence of passengers, transported luggage or goods on a vehicular entity; transmitting wireless information and data about the passenger IDs, the transported luggage or goods to an internal communication component associated to a vehicular computing device of the vehicular entity; keeping in a memory portion associated to the vehicular computing device said information and data; authorizing the encrypted transmittal of said information and data to an external entity upon receipt of an encrypted authorization request.

Disclosed herein is also a method generating a vehicular private key and a vehicular public key, providing the vehicular public key to an external communication component associated with a portable detection device, receiving an external public key from the external communication component, encrypting data using the external public key, providing the encrypted data to the external communication component, the vehicular data relating to at least one of: vehicle ID, driver ID/permissions, passengers IDs/permissions, and/or transported goods, and receiving validation data from the external communication component in response to providing the encrypted data to the external communication component. The method further comprises decrypting the received validation data using the vehicular private key.

Moreover, the present disclosure also refers to a method comprising the phases of activating a wireless communication component of a vehicular entity through an external communication component; transmitting encrypted information to the external communication component about at least one of passengers, transported goods, and/or vehicle ID; and detecting all the information provided by the vehicular entity to transmit these information to a remote administrative unit Advantageously, by introducing an efficient and secure form of communication in proximity of a check point, as well as an ability to accurately identify any approaching vehicular entity, information related to nefarious activity can be rejected, avoided, discarded, etc. together with an improvement of the checking operations. Public keys can be exchanged and used to encrypt data while private keys, which remain private and exclusive to a single entity, can be used to decrypt data. In this way, those entities without the private key are prevented from intercepting the exchanged data and using it for purposes other than initially intended. Further, certificates and signatures can be used to verify identities of a sender of data and insure that data originates from an intended source.

It is noted that although the present disclosure will refer to a preferred embodiment wherein the approaching entity communicating with the external entity is a vehicular entity (such as: private vehicles or also vehicles intended to transport people and/or goods; autonomous vehicles and/or rental cars), the present disclosure is not limited thereto and can be applied also to other devices, such as communication components carried by pedestrians (e.g. electronic IDs and the like) where the communication can rely on RFID or similar technology.

FIG. 1 is a block diagram of an example vehicular entity 100 according to an embodiment of the present disclosure. The vehicular entity 100 can be an autonomous vehicle, a traditional non-autonomous vehicle, an emergency vehicle, a service vehicle, or the like.

The vehicular entity 100 includes a vehicle computing device 110, such as an on-board computer. The vehicle computing device 110 includes a processor 120 coupled to a vehicular communication component 130, such as a reader, writer, and/or other computing device capable of performing the functions described below, that is coupled to (or includes) an antenna 140. The vehicular communication component 130 includes a processor 150 coupled to a memory 160, such as a non-volatile flash memory, although embodiments are not so limited to such a kind of memory devices.

In particular, the memory 160 is adapted to store all the information related to the vehicle, i.e. the driver, the passengers and the carried goods, in such a way that the vehicular entity 100 is able to provide this information when approaching a check point by using a particular communication technology (for example the so-called DICE-RIoT protocol), as it will be described below.

More in particular, the vehicle information (such as vehicle ID/plate number) is preferably already stored in the vehicle memory 160, and then the vehicular entity 100 is able to identify, for example through the communication component 130 and by using a known DICE-RIoT protocol or a similar protocol, the electronic ID of the passengers and/or the IDs of the carried luggage, goods and the like, and then to store this information in the memory 160. To this purpose, electronic IDs, transported luggage or goods containers shall be equipped with wireless transponders, NFC, Bluetooth, RFID, touchless sensors, magnetic bars, and the like, and the communication component 130 can use readers and/or electromagnetic field to acquire the needed info from such remote sources.

In more general terms, all the passenger IDs and/or the IDs of the carried luggage, goods and the like shall be equipped with electronic devices capable to exchange data with a communication component. Those electronic devices may be active or passive elements in the sense that they may be active because supplied by electric power or may be activated and powered by an external electric supply source that provided the required electric supply just when the electric device is in its proximity.

Rental vehicles or autonomous vehicles can use readers and/or electromagnetic field to acquire information inside or in the proximity of the vehicle or, as an alternative, may receive information even from remote sources, for instance when the driver of a rental vehicles is already known to the rental system because of a previous reservation. A further check may be performed in real time when the driver arrives to pick up the vehicle.

Similarly, all the information about the transported luggage or goods (and also about the passengers) carried by the vehicular entity 100 may be always up-to-date. To do so, the electronic ID of the passengers and/or the IDs of the carried luggage or goods are up-dated in real time thanks to the wireless transponders associated to the luggage or good or owned by the passengers, as shown schematically in FIG. 1.

Clearly, the communication between the vehicular communication component 130 and the proximity sources (e.g., the goods transponders and the like), although occurring preferably via the DICE-RIoT protocol, can rely on any another suitable communication technology, not necessarily through encrypted data.

For completeness sake, we have to note that the vehicle computing device 110 can control operational parameters of the vehicular entity 100, such as steering and speed. For example, a controller (not shown) can be coupled to a steering control system 170 and a speed control system 180. Further, the vehicle computing device 110 can be coupled to an information system 190. Information system 190 can be configured to display a message, such as the route information or a check point security message and can display visual warnings and/or output audible warnings. The communication component 130 can receive information from additional computing devices, such as from external computing devices as schematically depicted in FIG. 2.

Figure 2:
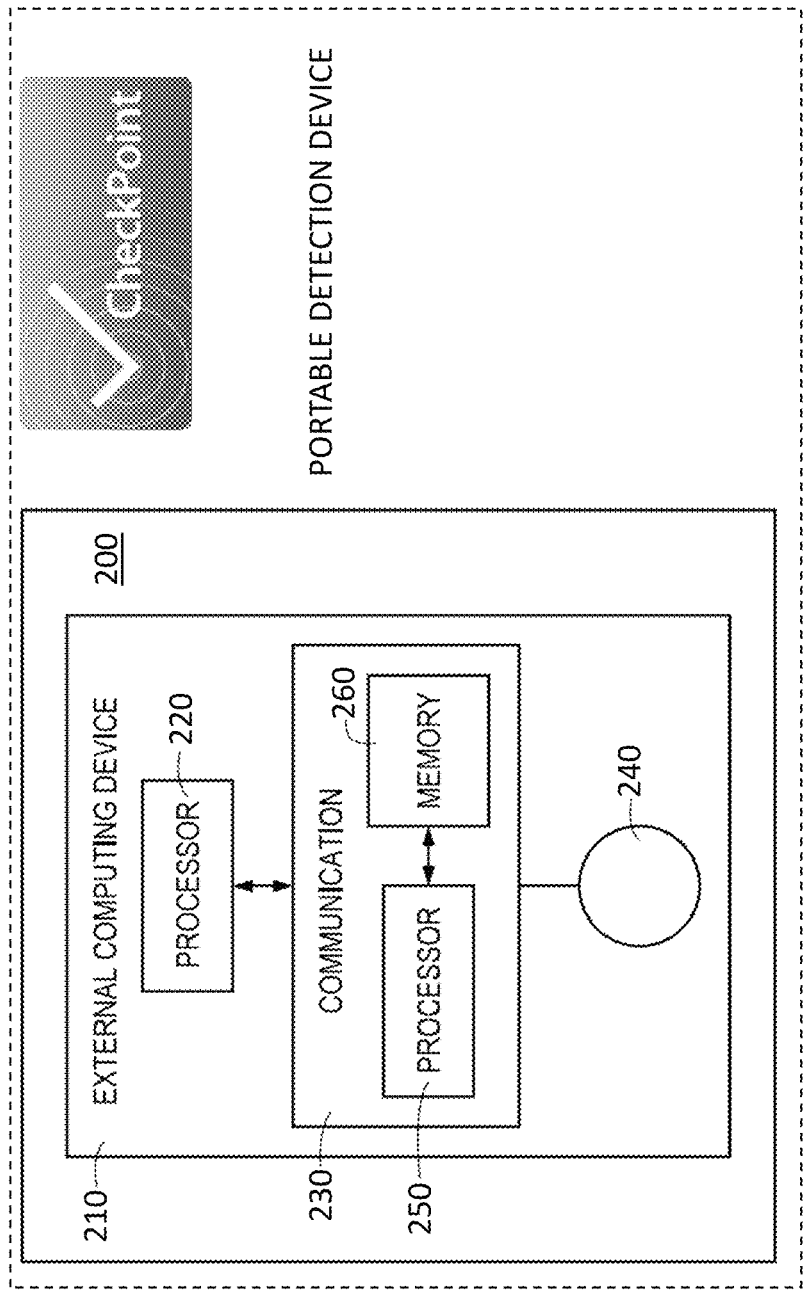
FIG. 2 is a block diagram of an example transportation assistance entity, such as a road or lane including an external communication component, in accordance with an embodiment of the present disclosure.

FIG. 2 is a block diagram of an example of external entity 200, such as a device arranged at a check point control entity or, generally, a control entity of a portable detection device. The external entity 200 includes an external computing device 210, such as an on-board computer. The external computing device 210 includes a processor 220 coupled to an external communication component 230, such as a reader, writer, and/or other computing device capable of performing the functions described below, that is coupled to (or includes) an antenna 240. The communication component 230 can in turn include a processor 250 coupled to a memory 260, such as a non-volatile flash memory, although embodiments are not so limited. The antenna 240 of the external computing device 210 can be in communication with the antenna 140 of the vehicular entity 100 of FIG. 1.

In some examples, antennas 240 and 140 can be loop antennas configured as inductor coils, such as solenoids. Antenna 140 can loop around vehicular entity 100, for example. Antenna 140 can generate an electromagnetic field in response to current flowing through antenna 140. For example, the strength of the electromagnetic field can depend on the number of coils and the amount of current. The electromagnetic field generated by antenna 140 can induce current flow in an antenna 240 that powers the respective external computing device 210, and vice versa. As an example, antenna 140 in FIG. 1 can induce current flow in antenna 240 when vehicular entity 100 brings antenna 140 to within a communication distance (e.g., a communication range) of the antenna 240. The communication distance can depend on the strength of the electromagnetic field generated by the antenna 140. The electromagnetic field generated by the antenna 140 can be set by the number of coils of antenna 140 and/or the current passing through antenna 140. In some examples, the communication distance can be about 50 centimeters to about 200 centimeters between the communication devices.

This example of FIG. 2 has been disclosed as an external entity; however, the structure and functioning of the external computing device 210 incorporated into this external entity 200 may correspond to the structure and functioning of the internal entity disclosed with reference to FIG. 1 as vehicle computing device 110. In other words, the vehicle computing device is capable to acquire internally and in real time all the information about the passengers, luggage or goods equipped with wireless transponders, NFC, Bluetooth, RFID, touchless sensors, magnetic bars, and the like allowing to keep in the memory 160 all data relating to the vehicle content.

Coming back to the example of FIG. 2, also the external computing device 210 can include a plurality of wireless communication devices, such as transmitters, transponders, transceivers, or the like. As an example, the external communication component 230 can be such a wireless communication device. In some examples, wireless communication devices can be passive wireless communication devices that are powered (e.g., energized) by the vehicular entity 100, or, preferably, vice versa. Wireless communication devices can be located at police check points, in portable detection devices, border security stations, or also along a route or road on which the vehicular entity 100 can travel. For example, wireless communication devices can be embedded in the roads, embedded and/or located on the walls of a tunnel along the route, or on the walls of a station at a check point/gate, located on signs, such as traffic signs, along the route, located in and/or on traffic-control lights along the route, located in and/or on other vehicles along the route (such as police vehicles), on (e.g., portable detection devices carried by and/or worn by) police officers along the route, or the like.

Moreover, the external entity and the communication component can be arranged at controlled traffic zones, private controlled access (e.g., into truck hubs, taxi stations, etc.), reserved bus stop area (e.g., bus stop area reserved for only for a particular company or business), taxi parking, and the like.

Wireless communication devices can be short-range wireless communication devices, such as near field communication (NFC) tags, RFID tags, or the like. In at least one embodiment, wireless communication devices can include non-volatile storage components that can be respectively integrated into chips, such as microchips. Each of the respective chips can be coupled to a respective antenna. The respective storage components can store respective data/information.

In some examples, wireless communication devices can be reprogrammable and can be wirelessly reprogrammed in situ. For examples in which wireless communication devices are NFC tags, a wireless device with NFC capabilities and application software that allows the device to reprogram the NFC tags can be used to reprogram the NFC tags.

The wireless communication device (i.e. the wireless external communication component 230) can transmit/receive data/information to the vehicular communication component 130 in response to vehicular entity 100, including all transported passengers, luggage or goods, passing within the communication distance of the external wireless communication device. The information can be transferred in the form of signals, such as radio frequency signals. For example, devices can communicate using radio frequency signals.

For examples in which wireless communication devices are NFC tags, the communication component 130 can be an NFC reader and can communicate with wireless communication devices using an NFC protocol that can be stored in memory 160 for processing by processor 150. For example, communication component 130 and wireless communication devices can communicate at about 13.56 mega-Hertz according to the ISO/IEC 18000-3 international standard for passive RFID for air interface communications. For example, the information can be transmitted in the form of a signal having a frequency of about 13.56 mega-Hertz.

In some examples, the communication distance may be set such that wireless communication devices (i.e. the wireless external communication component 230) are activated/activates when vehicular entity 100 is within a specific range close to the wireless communication devices. For example, wireless communication devices can transmit information to the communication component 130, indicating that vehicular entity is approaching a check point control station. For example, the transmitted information can indicate that the vehicular entity 100 is close to a check point and the communication component 130 can transmit the information to the processor 150. The processor 150 can cause information system 190 to display a visual warning and/or sound an audible alarm, indicating that vehicular entity 100 is approaching a check point.

Moreover, the wireless communication devices can include information that is specific to and recognized only by particular vehicles that form a particular subset of all the vehicles passing by wireless communication devices, such as emergency vehicles (e.g., police or fire vehicles ambulances, or the like) or service vehicles. In all the given examples wherein the vehicular entity 100 is such kind of vehicle, the communication component 130 can be configured to recognize that information.

The vehicular communication component 130 can therefore be configured to energize/be energized by the external communication component 230 and send information to the external communication component 230, providing to the police check points or other administrative check points all the information related to the vehicle, such as driver or passenger IDs or also information related to the goods carried by the vehicle, as it will be disclosed below in greater detail. All the provided info has been previously electronically stored in the memory 160 of the vehicular entity 100. The provision of the vehicle ID/plate number is particularly important in case of self-driven vehicles, where proprietor information (and in general an identification of the vehicle) is to be given when approaching or crossing a check point.

In other embodiments, the communication component 130 can also be embedded in devices (such as electronic IDs) carried by pedestrians crossing a check point or in general passing through a limited access area, such devices providing information about the ID of the carrier.

Figure 3:
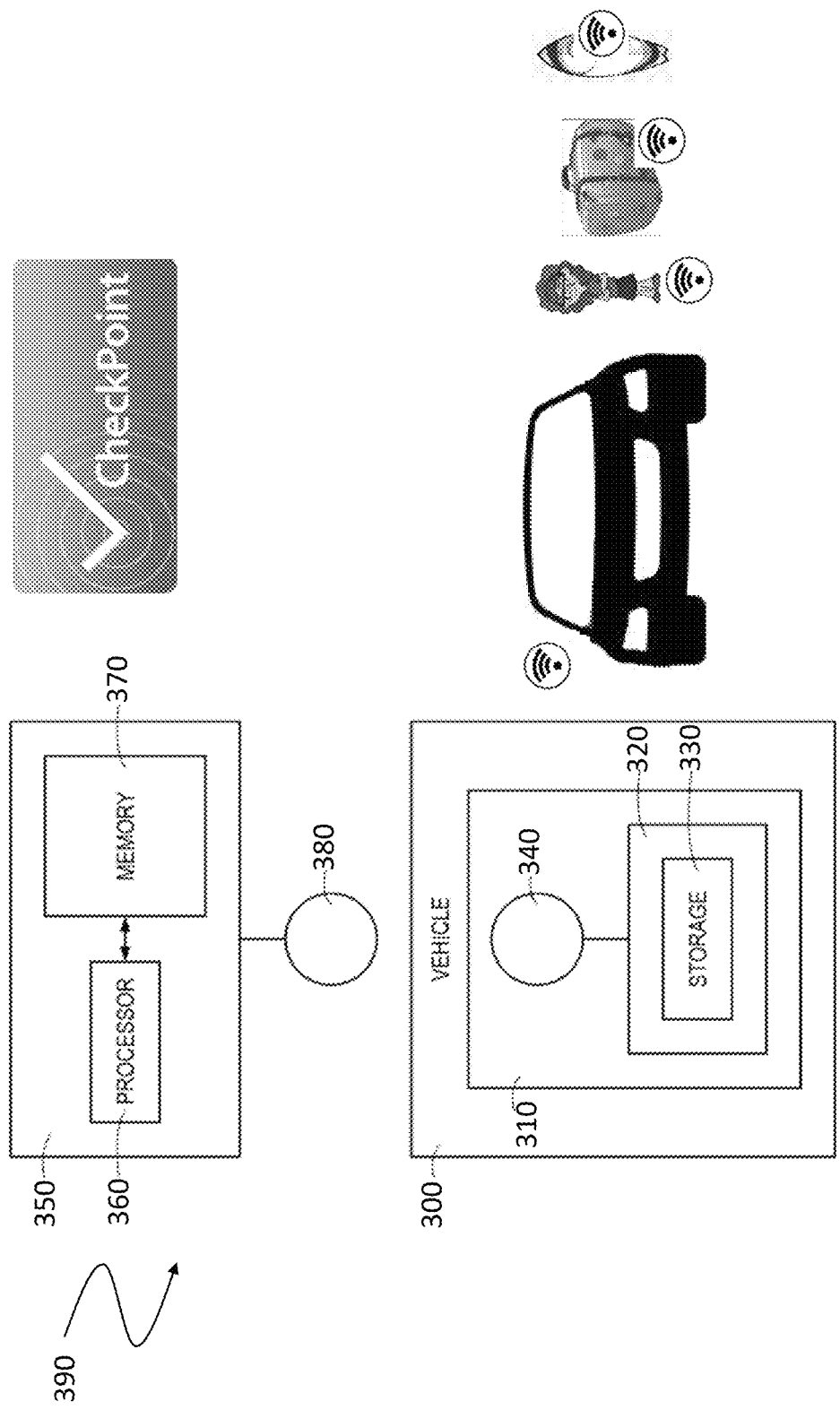
FIG. 3 illustrates an example communications system in accordance with an embodiment of the present disclosure.

FIG. 3 illustrates a communications system 390 according to an embodiment of the present disclosure. The system 390 preferably includes a passive communication component 310, such as a short-range communication device (e.g., an NFC tag but not limited thereto) that can be as described previously. The communication component 310 can be in a vehicular entity 300, which can be configured as shown in FIG. 1 for the vehicular entity 100 and include the components of vehicular entity 100 in addition to the communication component 310, which can be configured as the vehicular communication component 130. The communication component 310 includes a chip 320 having a non-volatile storage component 330 that stores information about the vehicular entity 300 as previously disclosed (such as vehicle ID, driver/passenger information, carried goods information, etc.). The communication component 310 can include an antenna 340.

The system 390 further includes a portable detection device 350, preferably an active communications device (e.g., that includes a power supply), which can receive the information from the communication component 310 and/or can transmit information thereto. In some examples, the portable detection device 350 can include a reader (e.g., an NFC reader), such as a toll reader, or other components. The portable detection device 350 can be an external device arranged (e.g., embedded) in proximity of a check point or in general in proximity of limited access areas. In some embodiments, the portable detection device 350 can also be carried by a policeman being a portable device.

The portable detection device 350 can include a processor 360, a memory 370, such as a non-volatile memory, and an antenna 380. The memory 370 can include an NFC protocol that allows the portable detection device 350 to communicate with the communication component 310. For example, the portable detection device 350 and the communication component 310 can communicate using the NFC protocol, such as at about 13.56 mega-Hertz and according to the ISO/IEC 18000-3 international standard. Clearly, also other approaches that use RFID tags are within the scope of the present invention.

The portable detection device 350 can also communicate with an operation center. For example, the portable detection device 350 can be wirelessly coupled or hardwired to a communication center. In some examples, the portable detection device 350 can communicate with the operation center via WIFI or over the Internet. The portable detection device 350 can energize the communication component 310 when the vehicular entity 300 brings antenna 340 within a communication distance of antenna 380, as described previously. In some examples, the portable detection device 350 can receive real-time information from the operation center and can transmit that information to vehicular entity 300. In some embodiments, also the communication component 310 can have its own battery.

The portable detection device 350 is therefore adapted to read/send information from/to the vehicle entity 300, which is equipped with the communication component 310 (preferably an active device) configured to allow information exchange.

Referring again to FIGS. 1 and 2, as the vehicular communication component 130 of the vehicular entity 100 is active internally to pick up in real time all the pertinent information concerning the passengers IDs, the transported luggage and/or goods, if equipped with the corresponding wireless communication means previously cited. The vehicles computing device may detect all the information in a space range of few meters, i.e. two or three meters, so that all data corresponding to passengers, luggage or goods may be easily detected. More or less, this is what happens when the vehicle approaches the external communication component 230 within a particular proximity so that communication can begin and/or become strengthened. The communication distance is usually a couple of meters.

In particular, as it will be clearer in the following, the vehicular communication component 130 can encrypt data when communicating to external entities but even with the internal entities. In some occasions, the data concerning the transported luggage, goods or even passengers may be confidential or include confidential information, for instance the health status of a passenger or confidential documents or a dangerous material; in such a case it is important that the information and data stored in the memory portion associated to the vehicle computing device could be kept as encrypted data.

Hereinafter we will disclose the encrypted and decrypted communication method between the internal vehicle computing device and the external entity both provided with corresponding communication components. It should be kept in mind that such a method may be applied even between the internal vehicle computing device and the electronic components associated to the passengers, the luggage or goods boarded on the vehicle.

Let's consider the case wherein the vehicular communication component 130 sends a vehicular public key to the external communication component 230 and the external communication component 230 can send an external public key to the vehicular communication component 130. These public keys (vehicular and external) can be used to encrypt data sent to each respective communication component and verify an identity of each and exchange confirmations and other information. As an example, as will described further below in association with FIGS. 4-9, the vehicular communication component 130 can encrypt data using the received external public key and send the encrypted data to the external communication component 230. Likewise, the external communication component 230 can encrypt data using the received vehicular public key and send the encrypted data to the vehicular communication component 130. Data sent by the vehicular entity 100 can include car information, passenger's information, goods information, and the like. The information can optionally be sent with a digital signature to verify an identity of the vehicular entity 100. Moreover, information can be provided to the vehicular entity 100 and displayed on a dashboard of the vehicular entity 100 or sent to an email associated with the vehicular entity 100. The vehicle can be recognized based on an identification of the vehicle, a VIN number, etc. along with a vehicular digital signature, as it will be disclosed below.

As mention before, nothing refrains from using the same encrypted protocol even for the internal communications inside the vehicle, even if this provision is not strictly necessary and shall not be considered a limitation in the application of the present invention.

In an example, data exchanged between the vehicular entity and the external entity can have a freshness used by the other. As an example, data sent by the vehicular entity to the external entity to indicate the exact same instructions can be altered at each of a particular time frame or for a particular amount of data being sent. This can prevent a hacker from intercepting confidential information contained in previously sent data and sending the same data again to result in the same outcome. If the data has been slightly altered but still indicates a same instruction, the hacker would send the identical information at a later point in time and the same instruction would not be carried out due to the recipient expecting the altered data to carry out the same instruction.

The data exchanged between the vehicular entity 100 and the external entity 200 can be performed using a number of encryption and/or decryption methods as described below. The securing of the data can insure that nefarious activity is prevented from interfering with the operation the vehicular entity 100 and the external entity 200.

Figure 4A:
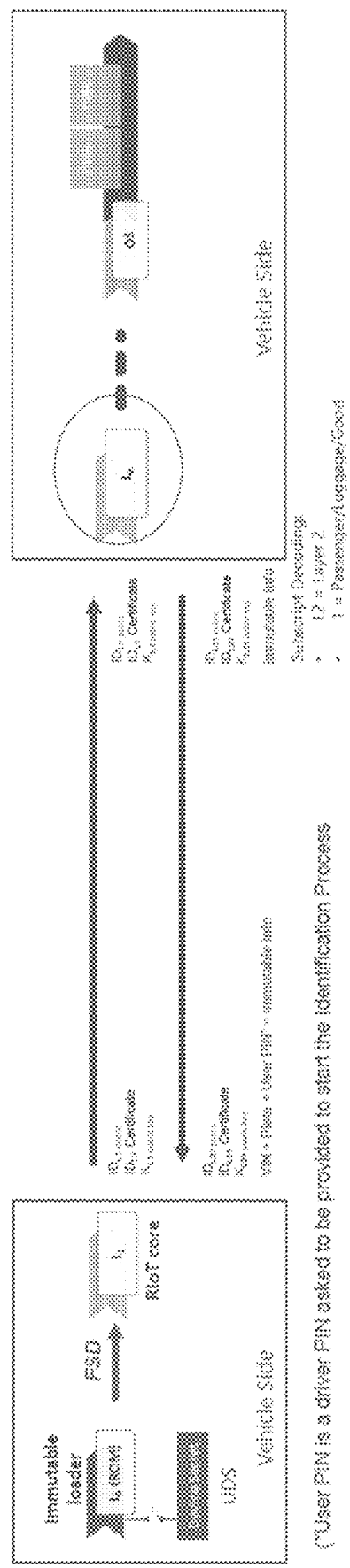
FIG. 4A illustrates an example of a communication system inside a vehicular entity, in accordance with an embodiment of the present disclosure.

FIG. 4A is block diagram of an example system including a couple of communication components performing encrypting and/or decrypting phases on information and data using a device identification composition engine (DICE)-robust internet of thing (RIoT) protocol. The schematic example may be applied to a communication between the vehicular communication component and an external communication component as well as to a communication performed internally to the vehicle environment between the vehicle communication component and the various wireless electronic devices that are associated to each of the passenger IDs, the luggage, the goods and the like.

Figure 4B:
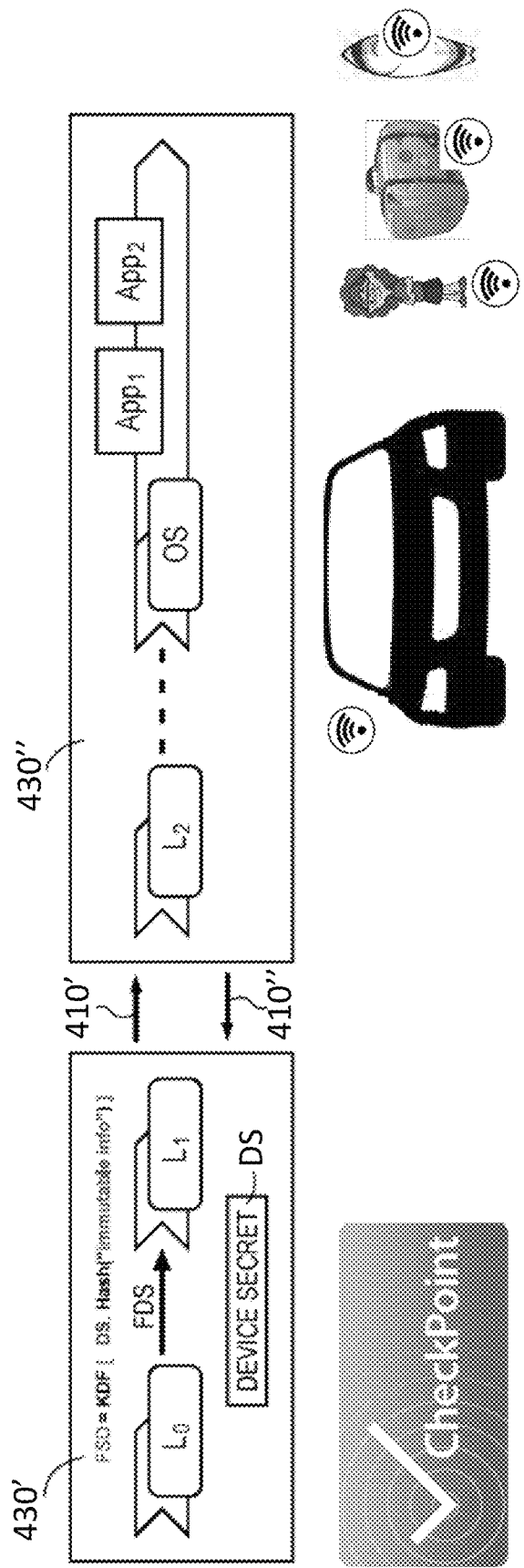
FIG. 4B illustrates an example of transportation environment, including a transportation assistance entity and vehicular entity, in accordance with an embodiment of the present disclosure.

FIG. 4B is a block diagram of an example system including an external communication component 430' and a vehicular communication component 430" in accordance with an embodiment of the present disclosure. As the vehicular entity comes near the external entity or in its proximity, the associated vehicular communication component 430" of the vehicular entity can exchange data with the external entity as described above for example using a sensor (e.g., a radio frequency identification sensor, or RFID, or the like).

According to the preferred communication protocol adopted in the present disclosure, i.e. the so-called DICE-RIoT protocol, a computing device can boot in stages using layers, with each layer authenticating and loading a subsequent layer and providing increasingly sophisticated runtime services at each layer. A layer can thus be served by a prior layer and serve a subsequent layer, thereby creating an interconnected web of the layers that builds upon lower layers and serves higher order layers. Of course, although the DICE-RIoT protocol is preferred, other protocols could be adopted.

In a typical implementation of the preferred communication protocol, security of the communication protocol is based on a secret value called "device secret", DS, that is set during manufacture (or also later). The device secret DS exists within the device on which it was provisioned. The device secret DS is accessible to the first stage ROM-based boot loader at boot time. The system then provides a mechanism rendering the device secret inaccessible until the next boot cycle, and only the boot loader (i.e. the boot layer) can ever access the device secret DS. Therefore, in this approach, the boot is layered in a specific architecture and all begins with the device secret DS.

As is illustrated in FIG. 4, Layer 0, $L_o$, and Layer 1, $L_1$, are within the external communication component 430'. Layer 0 $L_0$ can provide a Firmware Derivative Secret, FDS, key to Layer 1 $L_1$. The FDS key can describe the identity of code of Layer 1 $L_1$ and other security relevant data. A particular protocol (such as robust internet of things (RIoT) core protocol) can use the FDS to validate code of Layer 1 $L_1$ that it loads. In an example, the particular protocol can include a device identification composition engine (DICE) and/or the RIoT core protocol. As an example, the FDS can include Layer 1 $L_1$ firmware image itself, a manifest that cryptographically identifies authorized Layer 1 $L_1$ firmware, a firmware version number of signed firmware in the context of a secure boot implementation, and/or security-critical configuration settings for the device. The device secret DS can be used to create the FDS and is stored in the memory of the external communication component. Therefore, the Layer 0 $L_0$ never reveals the actual device secret DS and it provides a derived key (i.e. the FDS key) to the next layer in the boot chain.

The external communication component 430' is adapted to transmit data, as illustrated by arrow 410', to the vehicular communication component 430". The transmitted data can include an external identification that is public, a certificate (e.g., an external identification certificate), and/or an external public key, as it will be illustrated in connection with FIG. 5. Layer 2 $L_2$ of the vehicular communication component 430" can receive the transmitted data, execute the data in operations of the operating system, OS, for example on a first application $App_1$ and a second application $App_2$.

Likewise, the vehicular communication component 430" can transmit data, as illustrated by arrow 410", including a vehicular identification that is public, a certificate (e.g., a vehicular identification certificate), and/or a vehicular public key, as it will be illustrated in connection with FIG. 6. As an example, after the authentication (e.g., after verifying certificate), the vehicular communication component 430" can send a vehicle identification number, VIN, for further authentication, identification, and/or verification of the vehicular entity, as it will be explained in the following.

Figure 5:
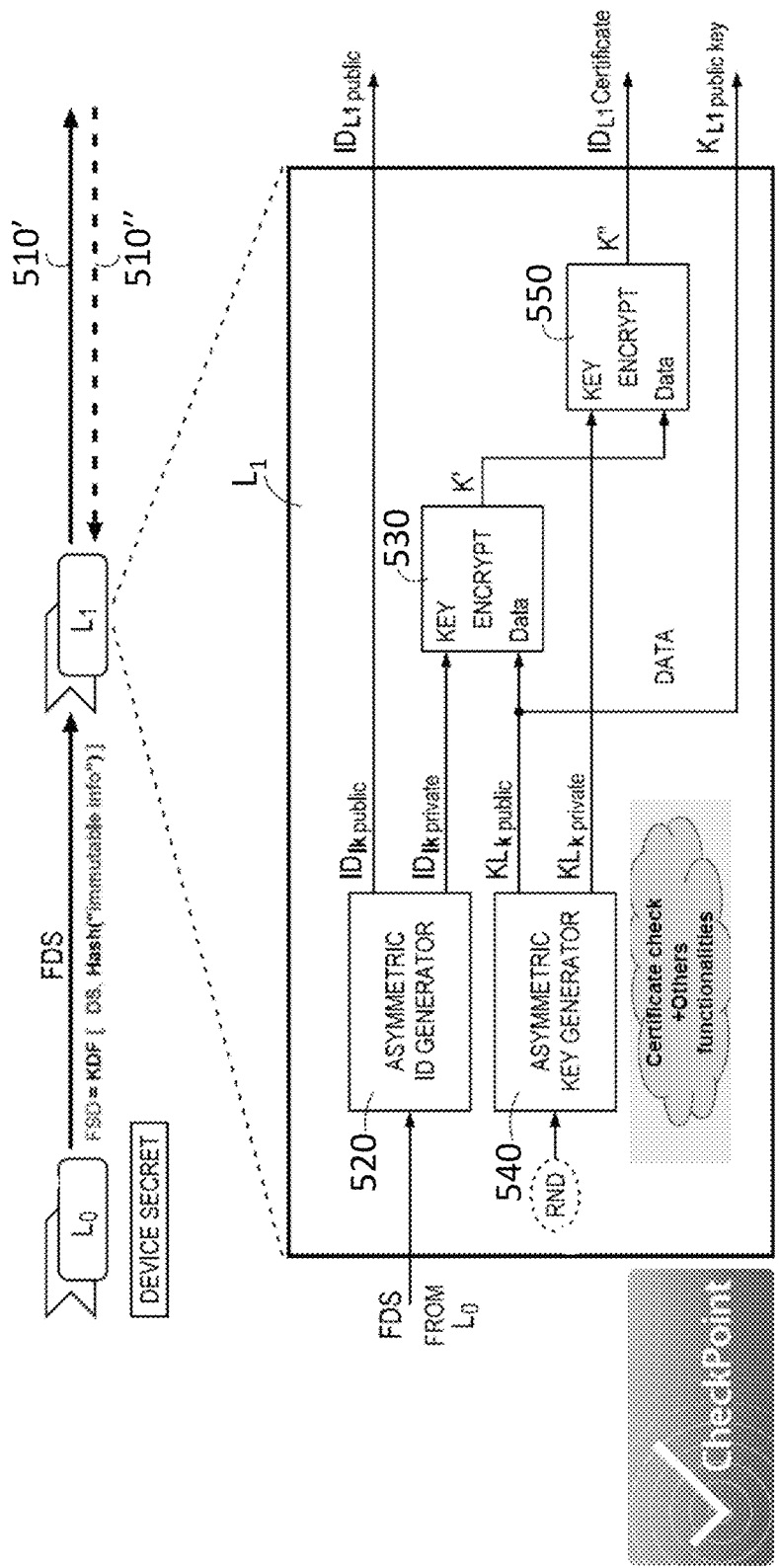
FIG. 5 is a block diagram of an example system including an external communication component and a vehicular communication component in accordance with an embodiment of the present disclosure.

As shown in FIGS. 4 and 5, in an example operation, the external communication component 430' can read the device secret DS, hash an identity of Layer 1 $L_1$, and perform the following calculation:

FDS=KDF[DS,Hash("immutable information")]

where KDF is a cryptographic one-way key derivation function (e.g., HMAC-SHA256). In the above calculation, Hash can be any cryptographic primitive, such as SHA256, MD5, SHA3, etc.

In at least one example, the vehicular entity can communicate using either of an anonymous log in or preferably an authenticated log in. The authenticated log in can allow the vehicular entity to obtain additional information that may not be accessible when communicating in an anonymous mode. In at least one example, the authentication can include providing the vehicular identification number VIN and/or authentication information, such as an exchange of public keys, as will be described below. In either of the anonymous and authenticated modes, the external entity (such as a check point police) can communicate with the vehicular entity to provide the external public key associated with the external entity to the vehicular entity.

FIG. 5 is a block diagram of an example process to determine parameters, in particular within the Layer $L_1$, of the external device, according to an embodiment of the present disclosure. More in particular, this is an example of a determination of the parameters including the external public identification, the external certificate, and the external public key that are then sent (as indicated by arrow 510') to Layer 2 $L_2$ of the vehicular communication component (e.g., reference 430" in FIG. 4). Arrows 510' and 510" of FIG. 5 correspond to arrows 410' and 410", respectively, of FIG. 4. Obviously, the layers in FIG. 5 correspond to the layers of FIG. 4.

As shown in FIG. 5, the FDS from Layer 0 $L_0$ is sent to Layer 1 $L_1$ and used by an asymmetric ID generator 520 to generate a public identification, IDlkpublic, and a private identification, IDlkprivate. In the abbreviated "IDlkpublic" the "lk" indicates a generic Layer k (in this example Layer 1 $L_1$), and the "public" indicates that the identification is openly shared. The public identification IDlkpublic is illustrated as shared by the arrow extending to the right and outside of Layer 1 $L_1$ of the external communication component. The generated private identification IDlkprivate is used as a key input into an encryptor 530. The encryptor 530 can be any processor, computing device, etc. used to encrypt data.

Layer 1 $L_1$ of the external communication component can include an asymmetric key generator 540. In at least one example, a random number generator, RND, can optionally input a random number into the asymmetric key generator 540. The asymmetric key generator 540 can generate a public key, KLkpublic, (referred to as an external public key) and a private key, KLkprivate, (referred to as an external private key) associated with an external communication component such as the external communication component 430' in FIG. 4. The external public key KLkpublic can be an input (as "data") into the encryptor 530. The encryptor 530 can generate a result K' using the inputs of the external private identification IDlkprivate and the external public key KLkpublic. The external private key KLkprivate and the result K' can be input into an additional encryptor 550, resulting in output K". The output K" is the external certificate, IDL1certificate, transmitted to the Layer 2 $L_2$. The external certificate IDL1certificate can provide an ability to verify and/or authenticate an origin of data sent from a device. As an example, data sent from the external communication component can be associated with an identity of the external communication component by verifying the certificate, as it will be described further in association with FIG. 7. Further, the external public key KL1public key can be transmitted to Layer 2 $L_2$. Therefore, the public identification IDl1public, the certificate IDL1certificate, and the external public key KL1public key of the external communication component can be transmitted to Layer 2 $L_2$ of the vehicular communication component.

Figure 6:
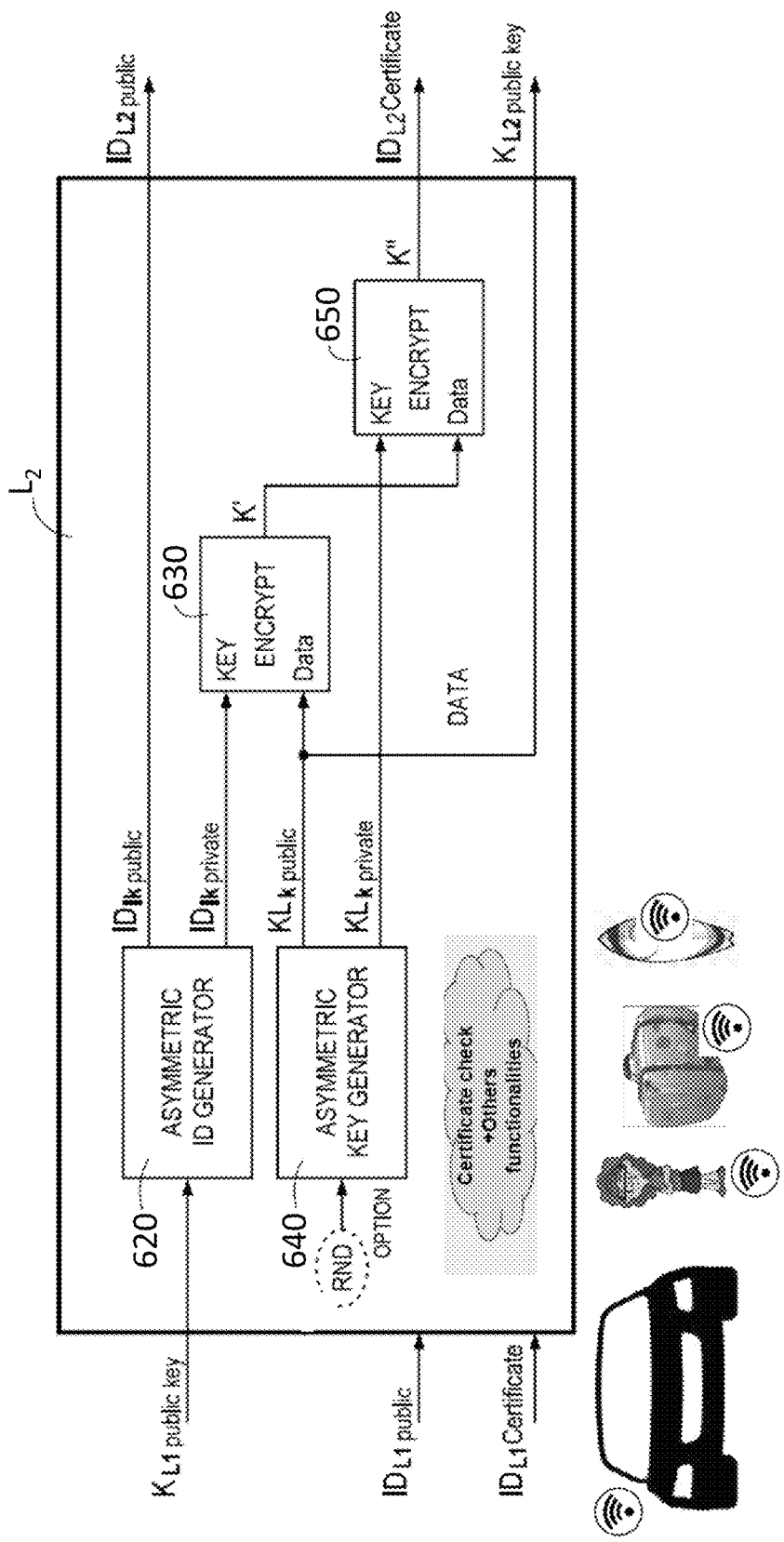
FIG. 6 is a block diagram of an example process to determine a number of parameters in accordance with an embodiment of the present disclosure.

FIG. 6 is a block diagram of an example process to determine a number of parameters, in particular within the Layer $L_2$ of the vehicular communication component, in accordance with an embodiment of the present disclosure. More in particular, FIG. 6 illustrates the Layer 2 $L_2$ of the vehicular communication component generating a vehicular identification, IDL2public, a vehicular certificate, IDL2certificate, and a vehicular public key, KL2public key.

In particular, as shown in FIG. 6, the external public key KL1public key transmitted from Layer 1 $L_1$ of the external communication component to Layer 2 $L_2$ of the vehicular communication component, as described in FIG. 5, is used by an asymmetric ID generator 620 of the vehicular communication component to generate a public identification IDlkpublic and a private identification IDlkprivate of the vehicular communication component. In the abbreviated "IDlkpublic" the "lk" indicates Layer k (in this example Layer 2), and the "public" indicates that the identification is openly shared. The public identification IDlkpublic is illustrated as shared by the arrow extending to the right and outside Layer 2 $L_2$. The generated private identification IDlkprivate is used as a key input into an encryptor 630.

Layer 2 $L_2$ of the vehicular communication component also includes an asymmetric key generator 640. In at least one example, a random number generator, RND, can optionally input a random number into the asymmetric key generator 640. The asymmetric key generator 640 can generate a public key KLkpublic (referred to as a vehicular public key) and a private key KLkprivate (referred to as a vehicular private key) associated with a vehicular communication component such as the vehicular communication component 430" in FIG. 4. The vehicular public key KLkpublic can be an input (as "data") into the encryptor 630. The encryptor 630 can generate a result K' using the inputs of the vehicular private identification IDlkprivate and the vehicular public key KLkpublic. The vehicular private key KLkprivate and the result K' can be input into an additional encryptor 650, resulting in output K". The output K" is the vehicular certificate IDL2certificate transmitted back to the Layer 1 $L_1$ of FIGS. 4 and 5. The vehicular certificate IDL2certificate can provide an ability to verify and/or authenticate an origin of data sent from a device. As an example, data sent from the vehicular communication component can be associated with an identity of the vehicular communication component by verifying the certificate, as will be described further in association with FIG. 7. Further, the vehicular public key KL2public key can be transmitted to Layer 1 $L_1$. Therefore, the public identification IDL2public, the certificate IDL2certificate, and the vehicular public key KL2public key of the vehicular communication component can be transmitted to Layer 1 $L_1$ of the external communication component.

In an example, in response to the external communication component receiving a public key from the vehicular communication component, the external communication component can encrypt data to be sent to the vehicular communication component using the vehicular public key. Vice versa, the vehicular communication component can encrypt data to be sent to the external communication component using the external public key. In response to the vehicular communication component receiving data encrypted using the vehicular public key, the vehicular communication component can decrypt the data using its own vehicular private key. Likewise, in response to the external communication component receiving data encrypted using the external public key, the external communication component can decrypt the data using its own external private key. As the vehicular private key is not shared with another device outside the vehicular communication component and the external private key is not shared with another device outside the external communication component, the data sent to the vehicular communication component and to the external communication component remains secure.

Figure 7:
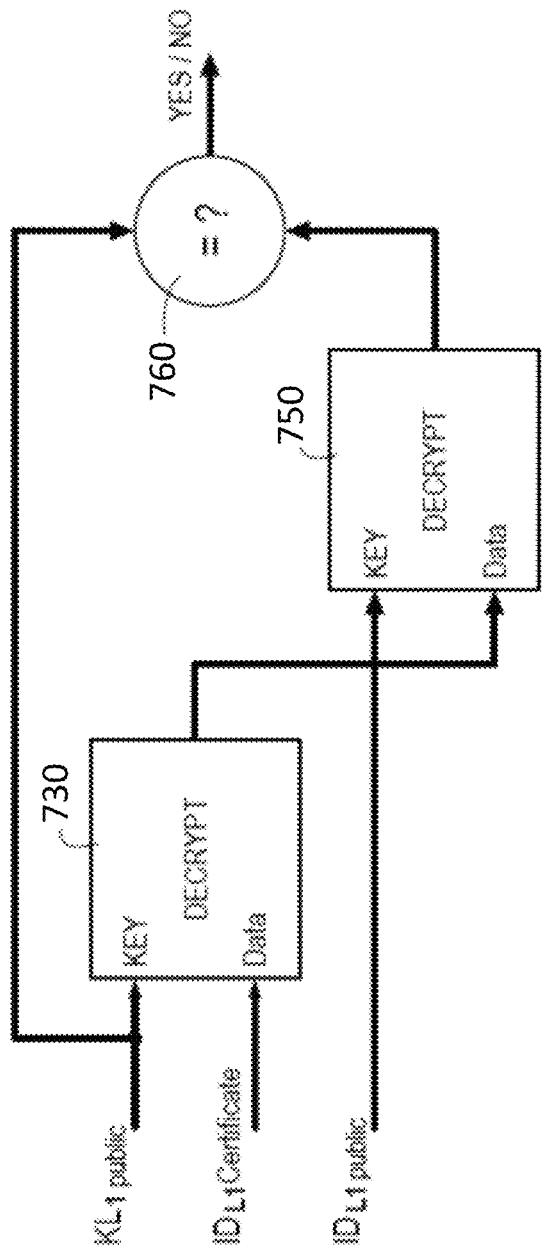
FIG. 7 is a block diagram of an example process to determine a number of parameters in accordance with an embodiment of the present disclosure.

FIG. 7 is a block diagram of an example process to verify a certificate in accordance with an embodiment of the present disclosure. In the illustrated example of FIG. 7, a public key KL1public, a certificate IDL1certificate, and a public identification IDL1public is provided from the external communication component (e.g., from Layer 1 $L_1$ of the external communication component 430' in FIG. 4). The data of the certificate IDL1certificate and the external public key KL1public can be used as inputs into a decryptor 730. The decryptor 730 can be any processor, computing device, etc. used to decrypt data. The result of the decryption of the certificate IDL1certificate and the external public key KL1public can be used as an input into a secondary decryptor 750 along with the public identification IDL1public, resulting in an output. The external public key KL1public and the output from the decryptor 750 can indicate, as illustrated at block 760, whether the certificate is verified, resulting in a yes or no as an output. Private keys are associated univocally with single layers and a specific certificate can only be generated by a specific layer. In response to the certificate being verified (i.e. after the authentication), data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 8:
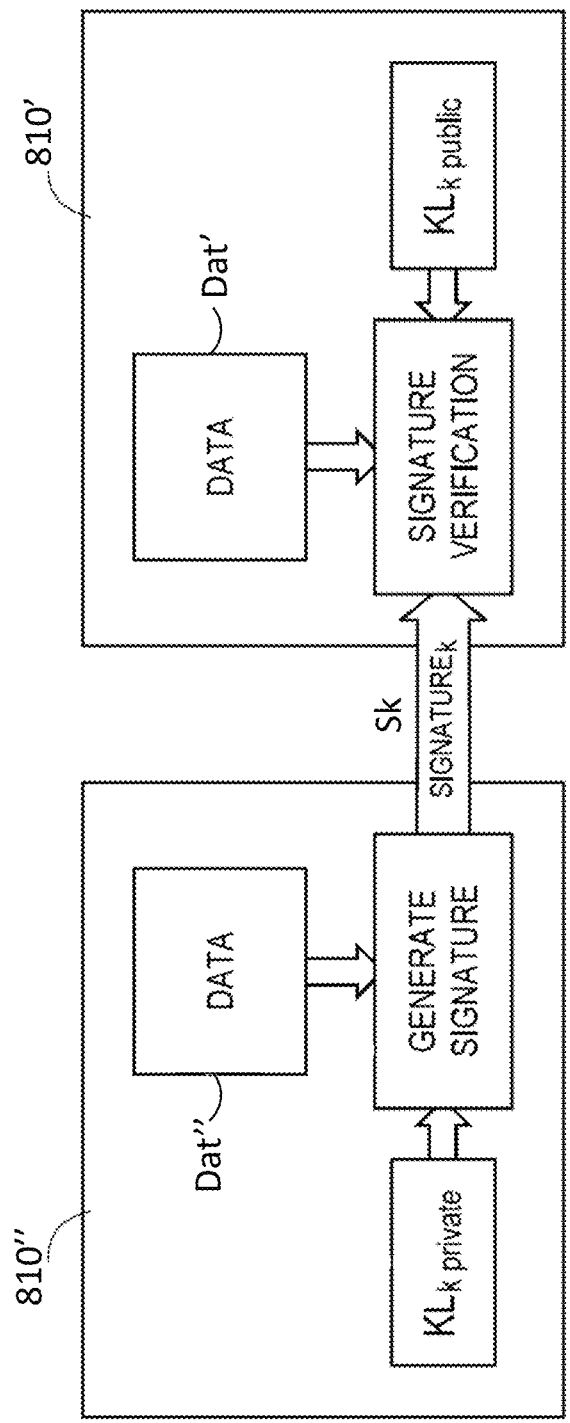
FIG. 8 is a block diagram of an example process to verify a certificate in accordance with an embodiment of the present disclosure.

FIG. 8 is a block diagram of an example optional process to verify a signature in accordance with an embodiment of the present disclosure. In the instance where a device is sending data that may be verified in order to avoid subsequent repudiation, a signature can be generated and sent with the data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A vehicle computing device 810" (such as vehicle computing device 110 in FIG. 1) can send data Dat" to an external computing device 810' (such as external computing device 210 of FIG. 2). The vehicle computing device 810" can generate a signature Sk using the vehicular private key KLkprivate. The signature Sk can be transmitted to the external computing device 810'. The external computing device 810' can verify using data Dat' and the public key KLkpublic previously received (i.e. the vehicular public key). In this way, signature verification operates by using a private key to encrypt the signature and a public key to decrypt the signature. In this way, a unique signature for each device can remain private to the device sending the signature while allowing the receiving device to be able to decrypt the signature for verification. This is in contrast to encryption/decryption of the data, which is encrypted by the sending device using the public key of the receiving device and decrypted by the receiving device using the private key of the receiver. In at least one example, the vehicle can verify the digital signature by using an internal cryptography process (e.g., Elliptical Curve Digital signature (ECDSA) or a similar process.

Thanks to the exchange and verification of the certificates and of the public keys, the devices are able to communicate in a secure way with each other. When a vehicle entity approaches an external entity (such as border security entity or, generally, an electronically controlled portable detection device), the respective communication devices (which have the capability shown in FIG. 7 of verifying the respective certificate) exchange the certificates and communicate to each other. After the authentication (e.g. after receiving/verifying from the external entity the certificate and the public key), the vehicle entity is thus able to communicate all the needed information related thereto and stored in the memory thereof, such as plate number/ID, VIN, insurance number, driver info (IDs, eventual permission for border transition), passengers info, transported goods info and the like. Then, after checking the received info, the external entity communicates to the vehicle the result of the transition request, this info being possibly encrypted using the public key of the receiver. The exchanged messages/info can be encrypted/decrypted using the above-describe DICE-RIoT protocol. In some embodiments, the so-called immutable info (such as plate number/ID, VIN, insurance number) is usually not encrypted, while other sensible info is encrypted. In other words, in the exchanged message, there can be not-encrypted data as well as encrypted data: the info can thus be encrypted or not or mixed. The correctness of the message is then ensured by using the certificate/public key to validate that the content of the message is valid.

Figure 9:
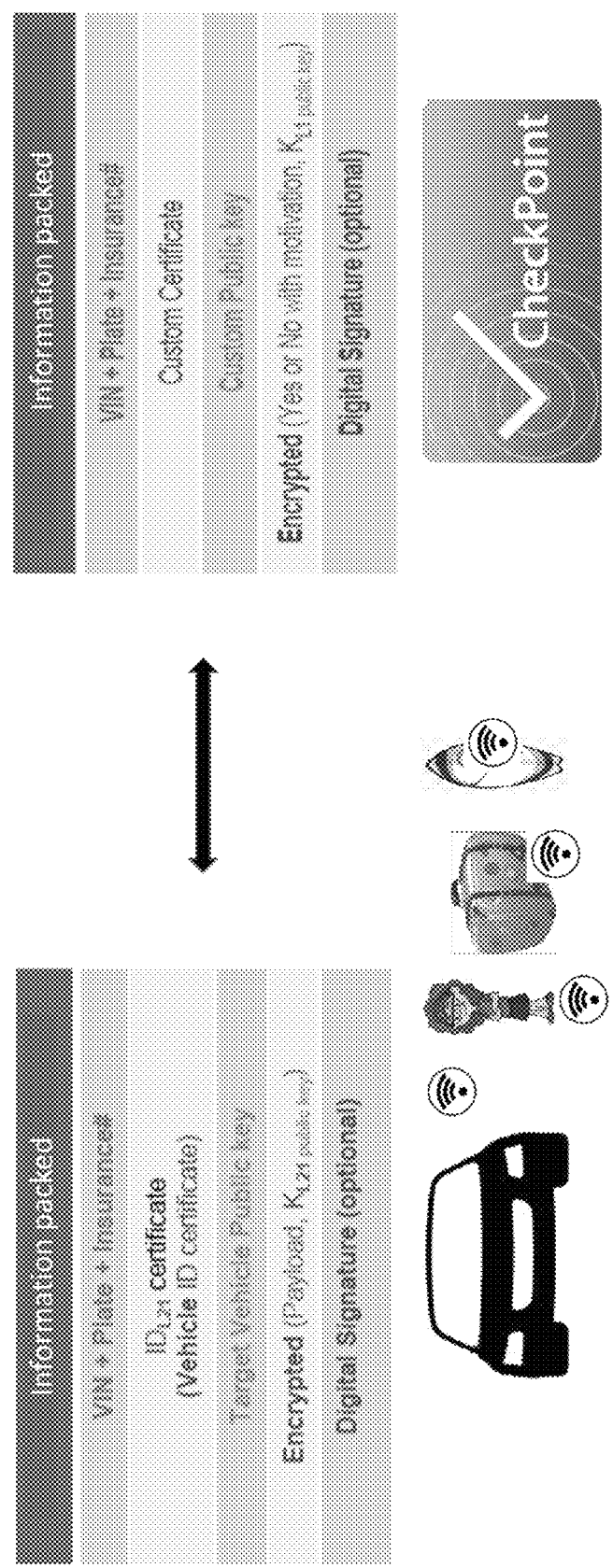
FIG. 9 is a block diagram of an example process to verify a signature in accordance with an embodiment of the present disclosure.

FIG. 9 illustrates the information packed and exchanged between the vehicle entity and the external entity, i.e. the exchanged message content. In particular, the vehicle entity sends to the external entity, in addition to the certificate, all the related info, such as the immutable info and other info stored that can be encrypted using the external public key, together with the vehicular public key, such info being then decrypted by using the private key of the receiver. Optionally, the sender can sign the whole packed message by using its private key and the receiver can verify the signature by using the public key of sender. On the other hand, the packed message sent by the portable detection device include, in addition to the certificate and to the external public key (which can be sent in first step), the info (which can be encrypted using the vehicular public key) which are related to permission/authorization to pass through a check point/limited access area, i.e. the portable detection device communicates the result of the transition request. Therefore, according to the present disclosure, the transit is authorized on the basis of the decrypted received data. As previously mentioned, the DICE-RIoT protocol is preferably adopted to perform the communication between the vehicle entity and the external entity.

Figure 10:
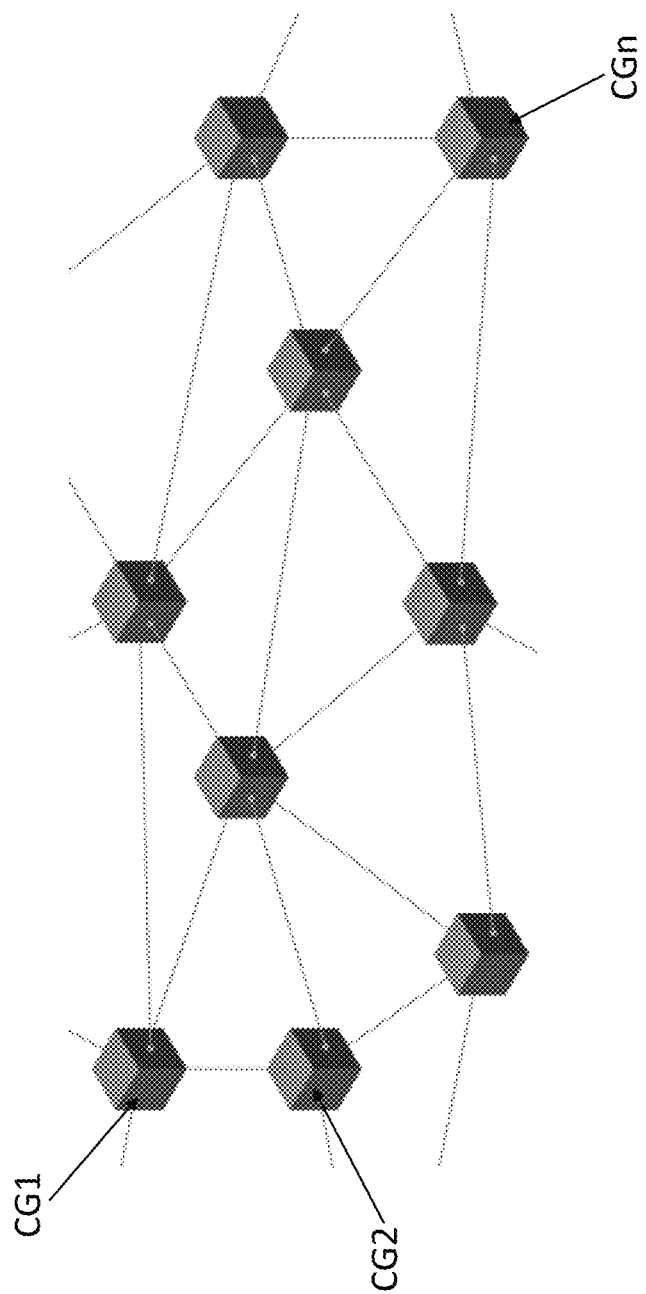
FIG. 10 shows a distributed network of ledgers for secure verification/authentication according to an embodiment of the present disclosure.

As schematically shown in FIG. 10, advantageously according to the present disclosure, a blockchain including a plurality of distributed ledgers arranged at a corresponding plurality of portable detection devices CG1, CG2, ..., CGn is used. In other words, the external computing entity is adapted to operatively communicate with the blockchain, wherein the local ledgers are related to corresponding respective portable detection devices located in different places. In this way, the processor of the external entity (such as the processor 250 of the external entity 200 of FIG. 2 or the processor 360 of FIG. 3) is configured to check a local ledger of the distributed system against the data received from the approaching vehicle entity.

The local ledger arranged at the gate to which the vehicle is approaching is thus checked to verify the identity of the passengers, the identity of the driver, the identity of the vehicle, the type of goods carried by the vehicle/passengers and similar information. In case of positive verification, for example if the information provided respect predetermined rules, the transaction/validation (i.e. the authorization to the transit) is written in the local ledger and the vehicle receives the approval to pass a check point/gate, according to the communication protocol described before.

The advantage of using a blockchain is that the local block entry is immediately sent to the distributed network for the approval: in this way, it is possible to verify the correctness of the transaction and update the distributed ledgers at the custom gates. The blockchain therefore determines an almost instantaneous real time update and synchronization of the ledgers at different gates, and, according to the blockchain architecture, each block is linked to the previous one using cryptographic signatures and the transcription of a transaction must be validated by 50%+1 devices connected in the network, therefore increasing the efficiency and security, preventing hacking of the database. In other word, the blockchain connects in a secure way all the gates, wherein the local information is updated in real time.

This allow to distribute in a network the information concerning that specific vehicle, the passengers and the transported luggage or goods thus allowing a speeder check of all the corresponding authorizations or permissions to receive proper assistance.

On the other hand, in case of negative verification (e.g. in case of documentation not valid), the vehicle receives a warning message and/or the communication to go to the local police office, sited close to a check point, and no authorization to the transit is sent to the vehicle.

According to an embodiment of the present disclosure, the authorization to the transit can be given at a time instant and at a place separated from the time instant and the place at which the information/keys are exchanged. For example, the exchange of the keys, certificates and vehicular information can occur at a first checkpoint, while the authorization/validation can be given at a second checkpoint. The first checkpoint can be placed for example 1 km-100 km away from a check point and the second checkpoint can be placed at a check point. In this case, the external entity is split in a first external entity, arranged away from a check point, and in a second external entity, arranged at a check point, those entities being equipped with respective communication components communicating with each other. In other words, a first external communication component of the first external entity is configured to receive the data from the communication component of the vehicular entity, and a second external communication component of the second external entity is configured to provide the authorization to the transit of the vehicular entity. In this embodiment, more time is available for verification by the external entity.

Summing up, the present disclosure provides that a vehicle, when approaching a portable detection device of a police check point, after authentication sends stored info to an external communication entity, preferably using the DICE-RIoT technology. Moreover, a blockchain (i.e. a distributed architecture based on distributed ledgers wherein each node contains a block with valid entries and is linked to the previous one using cryptographic signatures) is used as a way to store the people, goods, vehicles transit through the portable detection device (which can be a check point, an airport, a harbor or also a private area).

The apparatuses and methods of the present disclosure lead to several benefits. For example, the police would be no longer obliged to stop the vehicle to be inspected and ask for documents and/or permissions, such as the insurance or other administrative receipts.

It's not even necessary to check about the passenger IDs or about all the items on board since this information are immediately available to the check point officer provided with the portable detection device.

A fast identification of the driver, passengers and goods is also very important in many situations involving autonomous vehicles or rental cars for instance for tracking the owner of a rental, identifying a responsible of an accident; checking special transportations, controlling the access to reserved areas, private garages or authorizing the crossing of a border.

For instance, a fast help to passenger may be provided knowing quickly their health status when the vehicle is approaching or, in case of an accident, a fast call to emergency vehicles and aid may be provided.

Moreover, border control database can be immediately synchronized between all the gates of a country or also of different countries since the blockchain system ensures a quick and secure transcription of the operation in all the nodes of the network, so as to avoid falsification. In this case, it is possible to verify whether the same documents are used in several gates and that people, goods and vehicles are inside a nation or not. For example, if there is no border transition outside the country, a request to entry should be denied. Clearly, this solution is not limited to people/vehicle check but is applied also to type/quantity of goods (and to the corresponding compliance of import/export regulation). Moreover, the present solution can be applied to many portable detection devices, such as secure private/public areas. It is also observed that the disclosed solution enables to seed-up the checking operation by a check point police. All these benefits are obtained together with an improved security of the data exchanged.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. An apparatus, comprising:
   a memory configured to store information and data about at least one of passengers, luggage, and goods on a vehicular entity; and
   a processor coupled to the memory and configured to:
   activate responsive to a presence of the at least one of the passengers, luggage, and goods on the vehicular entity;
   generate an external private key and an external public key;
   provide the external public key to a portable detection device that is activated when the vehicular entity is approaching or in transit;
   receive data from the portable detection device in response to providing the external public key thereto;
   decrypt the received data using the external private key; and
   provide the information and data stored in the memory to the portable detection device based on an authorization in the decrypted received data.

2. The apparatus of claim 1, wherein the processor is configured to:
   encrypt the information and data stored in the memory; and
   provide the encrypted information and data stored in the memory to the portable detection device based on the authorization in the decrypted received data.

3. The apparatus of claim 1, wherein the memory is configured to store information and data about the vehicular entity.

4. The apparatus of claim 1, wherein the memory is configured to store information and data about a driver of the vehicular entity.

5. The apparatus of claim 1, wherein:
   a portion of the information and data stored in the memory is encrypted; and
   a portion of the information and data stored in the memory is not encrypted.

6. The apparatus of claim 1, wherein the information and data stored in the memory comprises real time information and data about at least one of the passengers, luggage, and goods.

7. The apparatus of claim 1, wherein the processor is configured to provide the external public key to the portable detection device and receive the data from the portable detection device using a radio frequency identification sensor.

8. The apparatus of claim 1, wherein the processor is configured to decrypt the received data using a device identification composition engine (DICE)-robust internet of thing (RIoT) protocol.

9. An apparatus, comprising:
   a memory configured to store information and data about at least one of passengers, luggage, and goods on a vehicular entity; and
   a processor coupled to the memory and configured to:
   activate responsive to a presence of the at least one of the passengers, luggage, and goods on the vehicular entity;
   operatively communicate with a blockchain system including plurality of distributed ledgers, wherein the plurality of distributed ledgers are related to a corresponding plurality of respective portable detection devices; and
   check a local ledger of the blockchain system against the information and data stored in the memory.

10. The apparatus of claim 9, wherein the processor is configured to activate responsive to being in proximity of one of the plurality of portable detection devices.

11. The apparatus of claim 9, wherein the processor is configured to receive an encrypted certificate.

12. The apparatus of claim 11, wherein the processor is configured to manage the encrypted certificate.

13. The apparatus of claim 11, wherein the encrypted certificate is sent to the processor using an asymmetric identification generator.

14. The apparatus of claim 9, wherein the processor is configured to:
   receive additional data that instructs the processor to execute an instruction; and
   alter the additional data based on a parameter.

15. The apparatus of claim 14, wherein the altered additional data still instructs the processor to execute the instruction.

16. An apparatus, comprising:
   a memory configured to store information and data about at least one of passengers, luggage, and goods on a vehicular entity; and
   a processor coupled to the memory and configured to:
   automatically transmit the information and data to the memory; and
   generate a certificate by:
   encrypting a vehicular public key and a vehicular private identification, resulting in an encrypted value; and
   encrypting the encrypted value and a vehicular private key.

17. The apparatus of claim 16, wherein the processor is configured to generate the vehicular public key and the vehicular private key using an asymmetric key generator.

18. The apparatus of claim 16, wherein the processor is configured to:

provide the vehicular public key and the vehicular private key to a portable detection device;

receive an external public key from the portable detection device;

encrypt the information and data stored in the memory; and provide the encrypted information and data to the portable detection device.

19. The apparatus of claim 18, wherein the processor is configured to:

receive validation data from the portable detection device in response to providing the encrypted information and data to the portable detection device; and decrypt the received validation data using the vehicular private key.

20. The apparatus of claim 16, wherein the processor is configured to update the information and data stored in the memory responsive to an additional passenger, luggage, or good being boarded on the vehicular entity.

* * * * *